(12) United States Patent
Nakajo

(10) Patent No.: US 6,313,472 B1
(45) Date of Patent: Nov. 6, 2001

(54) APPARATUS FOR READING RADIATION IMAGE INFORMATION

(75) Inventor: Masakazu Nakajo, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/417,366

(22) Filed: Oct. 13, 1999

(30) Foreign Application Priority Data

Oct. 16, 1998 (JP) .................................................. 10-295861

(51) Int. Cl.[7] .................................................. H05B 33/00
(52) U.S. Cl. .................................... 250/484.4; 250/472.1; 250/484.3
(58) Field of Search ................................ 250/472.1, 584, 250/484.2, 484.1, 484.3, 558, 487.1, 484.4

(56) References Cited

U.S. PATENT DOCUMENTS

| | | | |
|---|---|---|---|
| 4,851,679 | * 7/1989 | Tamura et al. | 250/327.2 |
| 4,947,043 | 8/1990 | Shimura | 250/327.2 |
| 5,130,541 | 7/1992 | Kawai | 250/327.2 |
| 5,534,710 | 7/1996 | Suzuki | 250/588 |

* cited by examiner

Primary Examiner—Hung Xuan Dang
(74) Attorney, Agent, or Firm—Sughrue, Mion, Zinn, Macpeak & Seas, PLLC

(57) ABSTRACT

A radiation image information reading apparatus has a main assembly which incorporates an exposure unit, an image information reading unit, an erasing unit, and a circulatory feed system. The image information reading unit has an auxiliary scanning feed mechanism for feeding a stimulable phosphor sheet vertically in an auxiliary scanning direction, and a laser beam applying mechanism for applying a laser beam substantially horizontally to the stimulable phosphor sheet which is being fed in the auxiliary scanning direction and scanning the stimulable phosphor sheet with the laser beam in a main scanning direction. The radiation image information reading apparatus is relatively simple in structure and small in size.

10 Claims, 5 Drawing Sheets

APPARATUS FOR READING RADIATION IMAGE INFORMATION

BACKGROUND OF THE INVENTION

1. Field of the Invention

The present invention relates to an apparatus for repeatedly recording and reading the radiation image information of a subject on and from a stimulable phosphor sheet housed in the apparatus.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

The stimulable phosphor is a phosphor which, when exposed to an applied radiation (X-rays, α-rays, γ-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor, or a stimulable phosphor sheet, is used for easy handling.

The above known system includes a built-in radiation image information reading apparatus which comprises an exposure unit for recording radiation image information of a subject on a stimulable phosphor sheet, an image information reading unit for applying stimulating rays to the stimulable phosphor sheet with the recorded radiation image information to photoelectrically reading the recorded radiation image information, and an erasing unit for erasing remaining image information from the stimulable phosphor sheet after the recorded image information has been read. The stimulable phosphor sheet is circulated or moved back and forth in the built-in radiation image information reading apparatus.

FIG. 5 of the accompanying drawings shows an internal structure of a general radiation image information reading apparatus 1. As shown in FIG. 5, the radiation image information reading apparatus 1 has an exposure unit 2 for temporarily recording radiation image information of a subject on a stimulable phosphor sheet S, an image information reading unit 3 for applying a laser beam L as stimulating rays to the stimulable phosphor sheet S to photoelectrically reading the recorded radiation image information, an erasing and feeding unit 4 for erasing remaining image information from the stimulable phosphor sheet S after the recorded image information has been read, a circulatory feed system 5 for circulating the stimulable phosphor sheet S, and a stacker 7 for placing therein a magazine 6 which houses the stimulable phosphor sheet S.

The image information reading unit 3 has an auxiliary scanning feed system 8 for feeding the stimulable phosphor sheet S in an auxiliary scanning direction indicated by the arrow A, an optical system 9 for applying the stimulable phosphor sheet S being fed in the auxiliary scanning direction in a main scanning direction substantially perpendicular to the auxiliary scanning direction, and a light guide system 10 for photoelectrically reading light emitted from the stimulable phosphor sheet S when the laser beam L is applied thereto.

In the image information reading unit 3, the stimulable phosphor sheet S is fed horizontally in the auxiliary scanning direction indicated by the arrow A. Therefore, the image information reading unit 3 is considerably elongate in the horizontal direction. Accordingly, the radiation image information reading apparatus 1 has a considerably large depth in the direction indicated by the arrow D.

SUMMARY OF THE INVENTION

It is therefore an object of the present invention to provide an apparatus for reading radiation image information, which has a relatively small construction and a reduced size.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
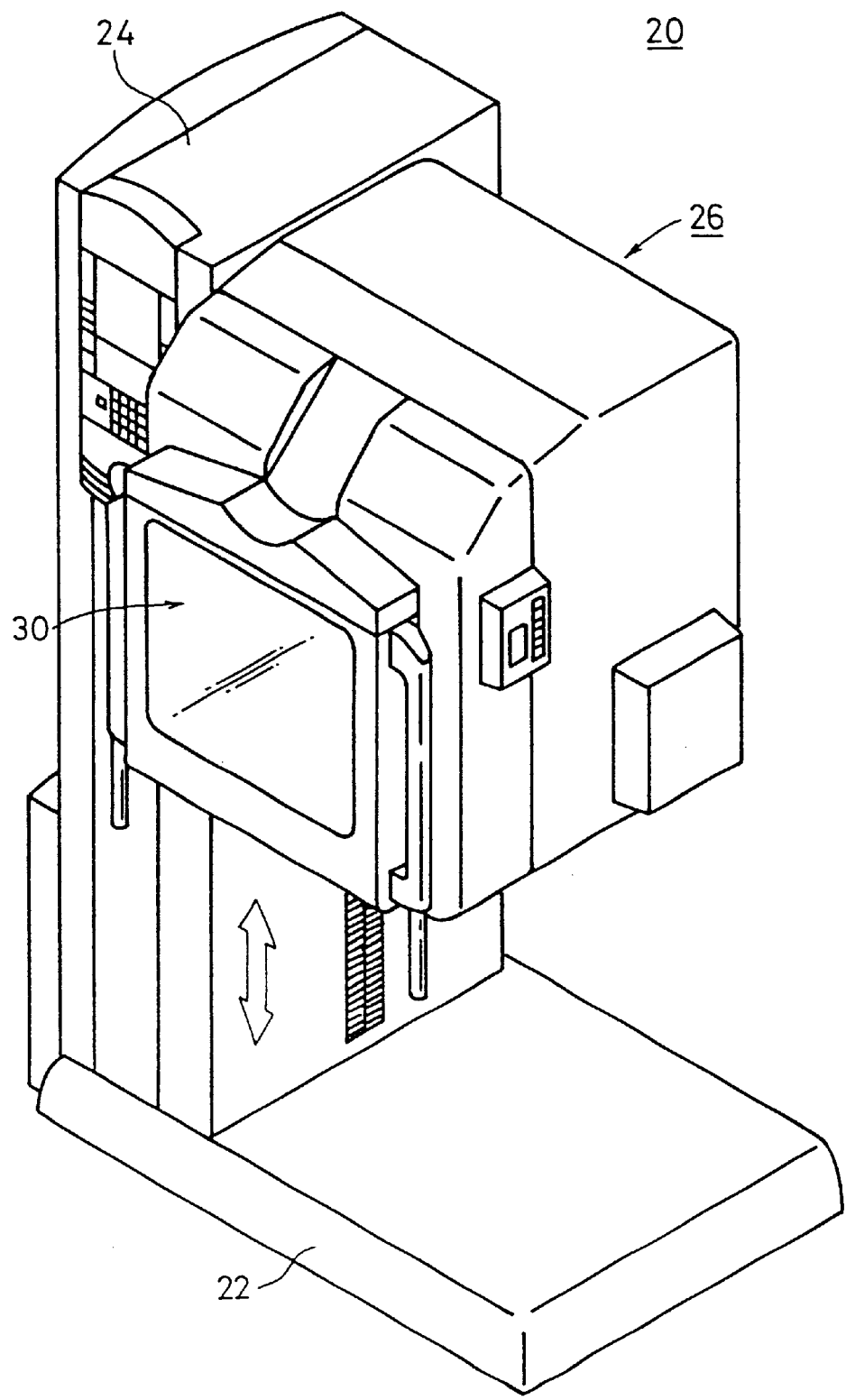
FIG. 1 is a perspective view of a radiation image information reading apparatus according to a first embodiment of the present invention.
Figure 2:
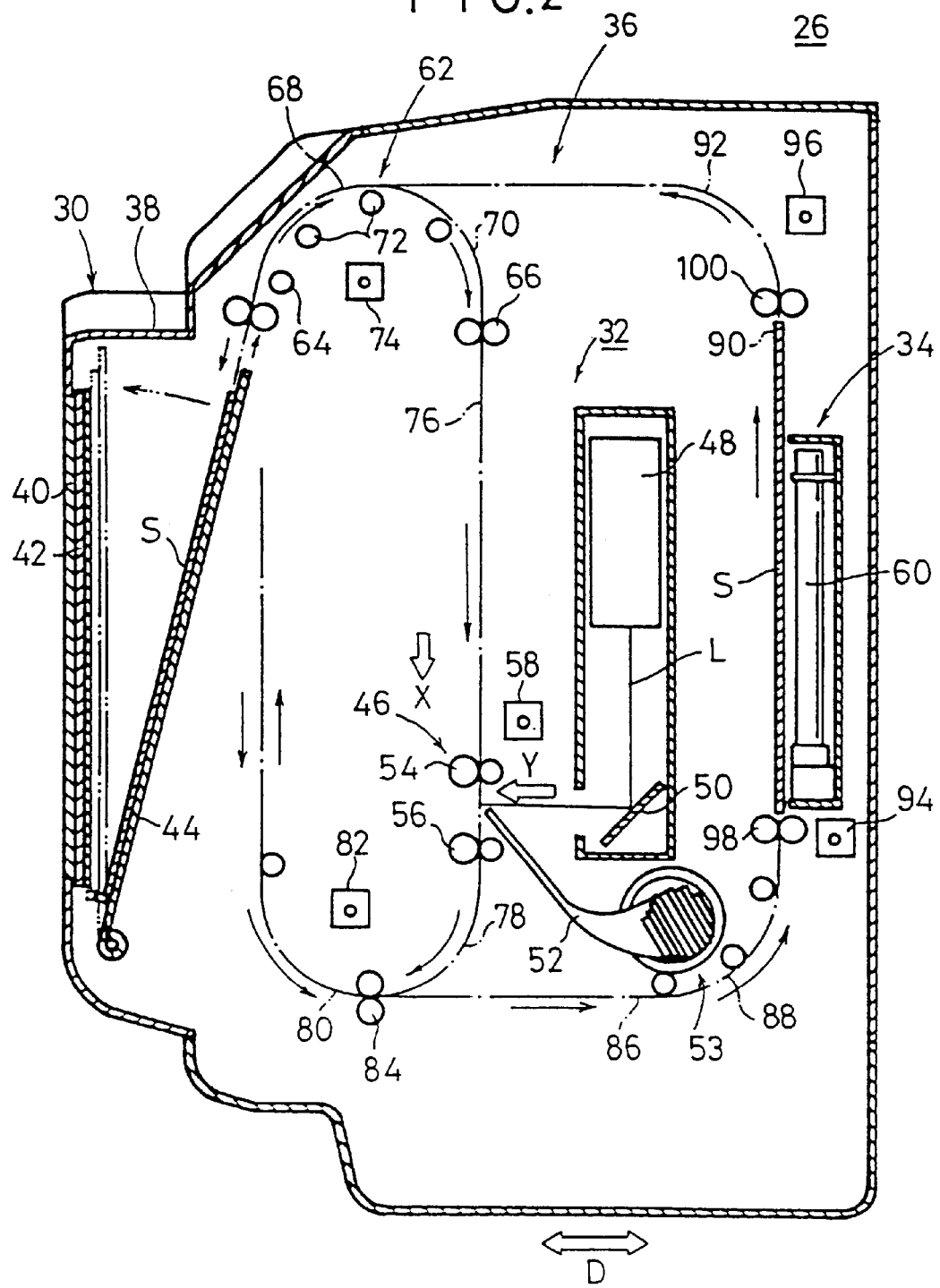
FIG. 2 is a vertical cross-sectional view of an internal structure of the radiation image information reading apparatus shown in FIG. 1.

FIG. 1 shows in perspective a radiation image information reading apparatus 20 according to a first embodiment of the present invention. FIG. 2 shows in vertical cross section an internal structure of the radiation image information reading apparatus 20.

As shown in FIG. 1, the radiation image information reading apparatus 20 has a lifting unit 24 mounted upwardly on a base 22. The radiation image information reading apparatus has a main assembly 26 vertically movably supported on the lifting unit 24 by an actuator (not shown) including a ball screw, a cylinder, etc. The radiation image information reading apparatus 20 operates by circulating two stimulable phosphor sheets S in the main assembly 26 for repeatedly recording and reading radiation image information of subjects on and from the stimulable phosphor sheets S.

As shown in FIG. 2, the main assembly 26 includes an exposure unit 30 for temporarily recording radiation image information of a subject on a stimulable phosphor sheet S, an image information reading unit 32 for applying a laser beam L as stimulating rays to the stimulable phosphor sheet W with the recorded radiation image information to photoelectrically reading the recorded radiation image information, an erasing unit 34 for erasing remaining image information from the stimulable phosphor sheet S after the recorded image information has been read, and a circulatory feed system 36 for circulating the two stimulable phosphor sheets S.

The exposure unit 30 has an exposure cover 38 mounted on a front face of the main assembly 26 and supporting a photo timer 40 and a grid 42 arranged successively from the subject (not shown), and a swingable presser plate 44 disposed near the grid 42 for holding the stimulable phosphor sheet S in an exposure position.

The image information reading unit 32 is disposed substantially parallel to the exposure unit 30. The image information reading unit 32 comprises an auxiliary scanning feed means 46 for feeding the stimulable phosphor sheet S vertically downwardly in an auxiliary scanning direction indicated by the arrow X, and a laser beam applying means (stimulating rays applying means) 48 for applying a laser beam L as stimulating rays to the stimulable phosphor sheet S which is being fed in the auxiliary scanning direction, substantially horizontally in the direction indicated by the arrow Y and scanning the stimulable phosphor sheet S with the laser beam L in a main scanning direction perpendicular to the auxiliary scanning direction.

The laser beam applying means 48 emits the laser beam L downwardly. The image information reading unit 32 includes an optical system 50 for directing the laser beam L substantially horizontally in the direction indicated by the arrow Y to the stimulable phosphor sheet S. A light guide 52 for collecting light emitted from the stimulable phosphor sheet S when the laser beam L is applied thereto is disposed in the vicinity of the beam applying position. A photomultiplier (not shown) is connected to the light guide 52, making up a reading means 53.

The auxiliary scanning feed means 46 has first and second roller pairs 54, 56 that are spaced a predetermined distance from each other in the vertical direction indicated by the arrow X. The first and second roller pairs 54, 56 are synchronously rotatable by a transmitting means (not shown) comprising a belt and pulleys and operatively coupled to a motor 58.

The erasing unit 34 is disposed substantially parallel to the exposure unit 30 and the image information reading unit 32, and extends vertically. The erasing unit 34 has a plurality of vertically extending erasing light sources 60. The erasing light sources 60 may instead extend horizontally.

The circulatory feed system 36 is disposed between the exposure unit 30 and the image information reading unit 32, and has a turning feed means 62 for turning the stimulable phosphor sheet S through 180° and feeding the stimulable phosphor sheet S from the exposure unit 30 to the image information reading unit 32. The turning feed means 62 is disposed between a roller pair 64 positioned near a sheet outlet of the exposure unit 30 and a roller pair 66 disposed above the image information reading unit 32. The turning feed means 62 comprises a pair of curved guide plates 68, 70 and a plurality of guide rollers 72 disposed beneath the curved guide plates 68, 70. The curved guide plates 68, 70 are of narrow dimensions for guiding opposite marginal edges of the stimulable phosphor sheet S where no radiation image information is recorded and read. The roller pairs 64, 66 are rotatable by a motor 74.

A pair of guide plates 76 for guiding the opposite marginal edges of the stimulable phosphor sheet S extends downwardly from the roller pair 66 toward the image information reading unit 32. Curved guide plates 78, 80 are disposed at a sheet outlet of the image information reading unit 32 for guiding the opposite marginal edges of the stimulable phosphor sheet S downwardly and then upwardly via a curved feed path. The curved guide plate 80 has a straight vertical end extending upwardly.

A roller pair 84 rotatable by a motor 82 is disposed between the curved guide plates 78, 80. A horizontal guide plate 86 extends from a position near the roller pair 84 toward the light guide 52. A vertical guide plate 90 extends upwardly from a curved guide plate 88 which is positioned near an end of the guide plate 86. The guide plate 90 extends along the erasing unit 34 and has an upper end positioned near a curve guide plate 92 whose end is positioned near the curved guide plate 68. Roller pairs 98, 100 rotatable respectively by motors 94, 96 are disposed below and above the guide plate 90.

Operation of the radiation image information reading apparatus 20 will be described below.

Two stimulable phosphor sheets S are housed in the main assembly 26. When one of the stimulable phosphor sheets S is placed in the exposure unit 30, the other stimulable phosphor sheet S is positioned in a standby mode in the erasing unit 34 (see FIG. 2). In the exposure unit 30, the presser plate 44 is turned toward a subject (not shown) to hold the stimulable phosphor sheet S in the exposure position. The radiation image information of a subject is recorded on the stimulable phosphor sheet S thus held in the exposure position.

The stimulable phosphor sheet S exposed to the radiation image information is then turned inwardly together with the presser plate 44, and thereafter delivered toward the roller pair 64. The roller pair 64 which is rotated by the motor 74 feeds the stimulable phosphor sheet S to the turning feed means 62. In the turning feed means 62, the curved guide plates 68, 70 and the guide rollers 72 guide the stimulable phosphor sheet S to the roller pair 66 while turning through 180°, after which the stimulable phosphor sheet S is transferred by the rotating roller pair 66 to the vertical guide plate 76. The stimulable phosphor sheet S is then delivered to the auxiliary scanning feed means 46 while its opposite marginal edges are being guided by the guide plate 76.

In the auxiliary scanning feed means 46, the first and second roller pairs 54, 56 are rotated by the motor 58. The stimulable phosphor sheet S is fed in the auxiliary scanning direction (downward direction) indicated by the arrow X while its opposite marginal edges are being gripped by the first and second roller pairs 54, 56.

At this time, the laser beam applying means 48 emits a laser beam L which travels downwardly and is then directed substantially horizontally in the direction indicated by the arrow Y by the optical system 50. The laser beam L is applied to scan the exposure surface of the stimulable phosphor sheet S in the main scanning direction. When the laser beam L is applied to the stimulable phosphor sheet S, the exposure surface of the stimulable phosphor sheet S emits light, which is collected by the light guide 52 and then photoelectrically read by the non-illustrated photomultplier.

When the recorded radiation image information is read from the stimulable phosphor sheet S by the image information reading unit 32, the leading end of the stimulable phosphor sheet S is guided by the curved guide plates 78, 80 and fed downwardly and then upwardly by the roller pair 84. After the radiation image information is fully read from the stimulable phosphor sheet S, the trailing end of the stimulable phosphor sheet S is delivered to a position near the roller pair 84. The roller pair 84 is then reversed by the motor 82.

The stimulable phosphor sheet S is fed horizontally along the guide plate 86 with its exposure surface facing downwardly, after which the stimulable phosphor sheet S is fed upwardly along the curved guide plate 88. The motor 94 rotates the roller pair 98 to feed the stimulable phosphor sheet S upwardly along the guide plate 90. The erasing light sources 60 of the erasing unit 34 are energized to erase any remaining image information from the stimulable phosphor sheet S. The stimulable phosphor sheet S from which the remaining image information has been erased remains positioned in the standby mode in the erasing unit 34.

When the radiation image information is being recorded on the stimulable phosphor sheet S in the exposure unit 30, the other stimulable phosphor sheet S is positioned in the standby mode in the erasing unit 34. While the radiation image information from the exposure unit 30 is being read from the stimulable phosphor sheet S, the other stimulable phosphor sheet S is gripped and delivered from the erasing unit 34 by the roller pair 100 rotated by the motor 96 to the curved guide plate 68 along the curved guide plate 92. The roller pair 64 is reversed to deliver the other stimulable phosphor sheet S into the exposure unit 30. The other stimulable phosphor sheet S is positioned in the exposure unit 30 by the presser plate 44 angularly moved to the exposure position. The radiation image information of a subject (not shown) is then recorded on the stimulable phosphor sheet S in the exposure unit 30.

In the first embodiment, the image information reading unit 32 for photoelectrically reading the radiation image information recorded on the stimulable phosphor sheet S is arranged such that it applies the laser beam L substantially horizontally to the stimulable phosphor sheet S while the stimulable phosphor sheet S is being fed downwardly in the auxiliary scanning direction indicated by the arrow X. Accordingly, the horizontal dimensions of the image information reading unit 32 are much smaller than a conventional image information reading unit in which the stimulable phosphor sheet S is scanned by the laser beam in the main scanning direction while the stimulable phosphor sheet S is being fed horizontally in the auxiliary scanning direction. As a consequence, the main assembly 26 has a greatly reduced depth in the direction indicated by the arrow D.

Furthermore, the exposure unit 30 and the image information reading unit 32 are disposed substantially parallel to each other, and the turning feed means 62 is provided for turning the stimulable phosphor sheet S through 180° and feeding the stimulable phosphor sheet S from the exposure unit 30 to the image information reading unit 32. Accordingly, the main assembly 26 is effectively simplified in structure, the exposure unit 30 and the image information reading unit 32 can be positioned closely to each other, and the main assembly 26 can be reduced in size.

In addition, the erasing unit 34 is disposed substantially parallel to the exposure unit 30 and the image information reading unit 32. The erasing unit 34 applies erasing light to the stimulable phosphor sheet S as it is fed upwardly. Therefore, the exposure unit 30, the image information reading unit 32, and the erasing unit 34 are oriented vertically and positioned closely together, allowing the dimensions in the depth of the main assembly 26 to be greatly reduced. Since two stimulable phosphor sheets S are housed in the main assembly 26, it is not necessary to provide a stacker for housing four stimulable phosphor sheets in the main assembly 26, unlike the conventional apparatus. Consequently, the main assembly 26 can further be reduced in size.

Figure 3:
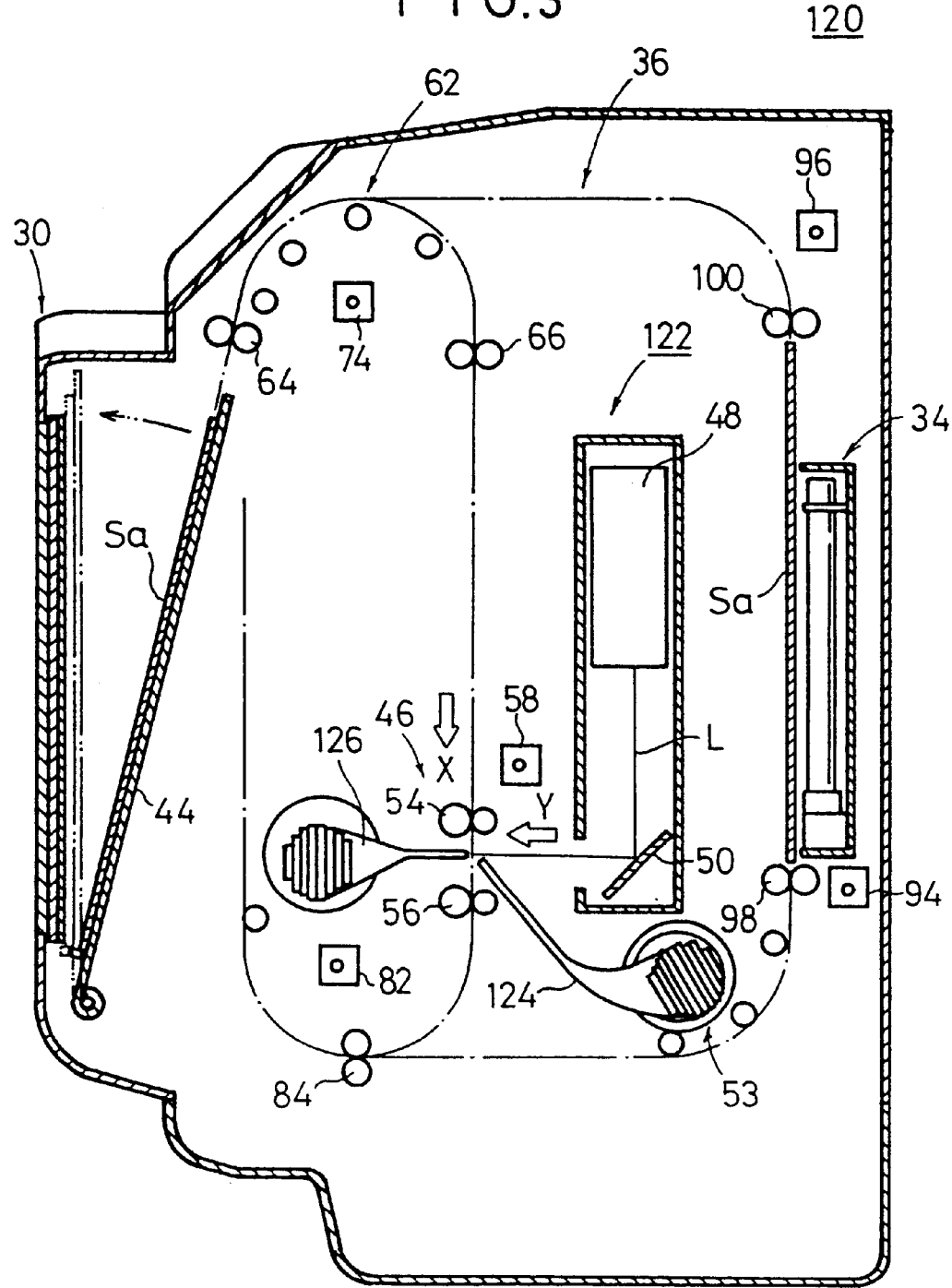
FIG. 3 is a vertical cross-sectional view of an internal structure of a main assembly of a radiation image information reading apparatus according to a second embodiment of the present invention.

FIG. 3 shows in vertical cross section an internal structure of a main assembly 120 of a radiation image information reading apparatus according to the second embodiment of the present invention. Those parts of the main assembly 120 which are identical to those of the main assembly 26 of the radiation image information reading apparatus 20 according to the first embodiment are denoted by identical reference numerals, and will not be described in detail below.

The main assembly 120 houses an image information reading unit 122 having first and second light guides 124, 126 disposed one on each side of opposite surfaces of a stimulable phosphor sheet Sa, for collecting light emitted from the opposite surfaces of the stimulable phosphor sheet Sa when a laser beam L is applied thereto. Photomultipliers (not shown) are connected respectively to the light guides 124, 126, making up a reading means 53. The stimulable phosphor sheet Sa comprises a transparent base so that when the laser beam L is applied to the exposure surface (emulsion-coated surface) of the stimulable phosphor sheet Sa, light is emitted from both the exposure surface and the reverse surface of the stimulable phosphor sheet Sa.

After the radiation image information of a subject (not shown) is recorded on the stimulable phosphor sheet Sa in the exposure unit 30, the stimulable phosphor sheet Sa is turned 180° by the turning feed means 62, and delivered to the image information reading unit 122. In the image information reading unit 122, the stimulable phosphor sheet Sa is fed downwardly in the auxiliary direction by the first and second roller pairs 54, 56, and the laser beam L from the laser beam applying means 48 is applied substantially horizontally to the stimulable phosphor sheet Sa.

At this time, the stimulable phosphor sheet Sa emits light from both the exposure surface and the reverse surface thereof, and the emitted light is collected by both the first and second light guides 124, 126 that are positioned one on each side of the stimulable phosphor sheet Sa. The collected light is photoelectrically converted by the non-illustrated photomultipliers.

In the second embodiment, as described above, when the laser beam L is applied to the stimulable phosphor sheet Sa, light emitted from both surfaces of the stimulable phosphor sheet Sa can reliably be collected by the light guides 124, 126, and hence the recorded radiation image information borne by the emitted light can be read highly accurately.

Figure 4:
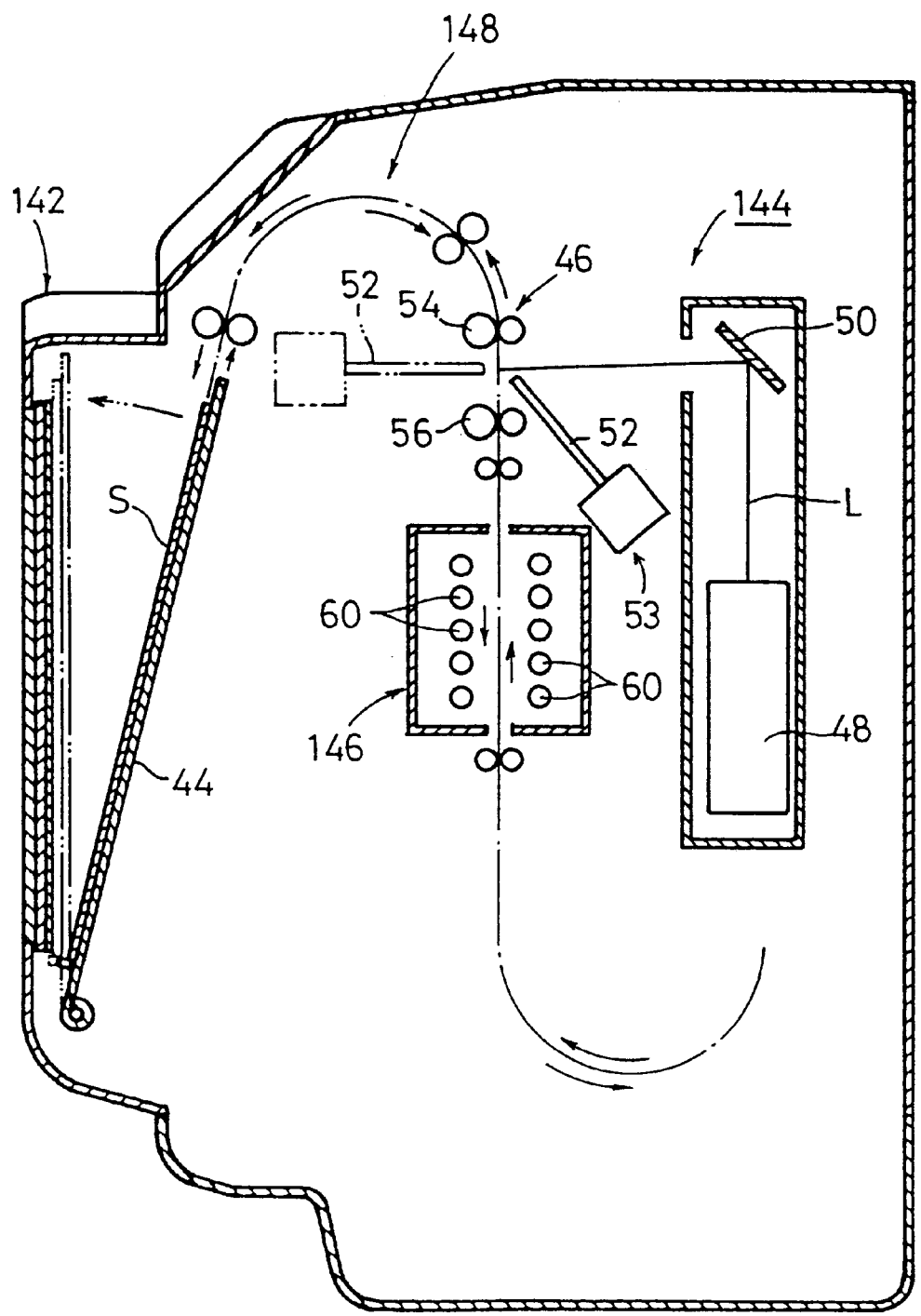
FIG. 4 is a vertical cross-sectional view of an internal structure of a main assembly of a radiation image information reading apparatus according to a third embodiment of the present invention.
Figure 5:
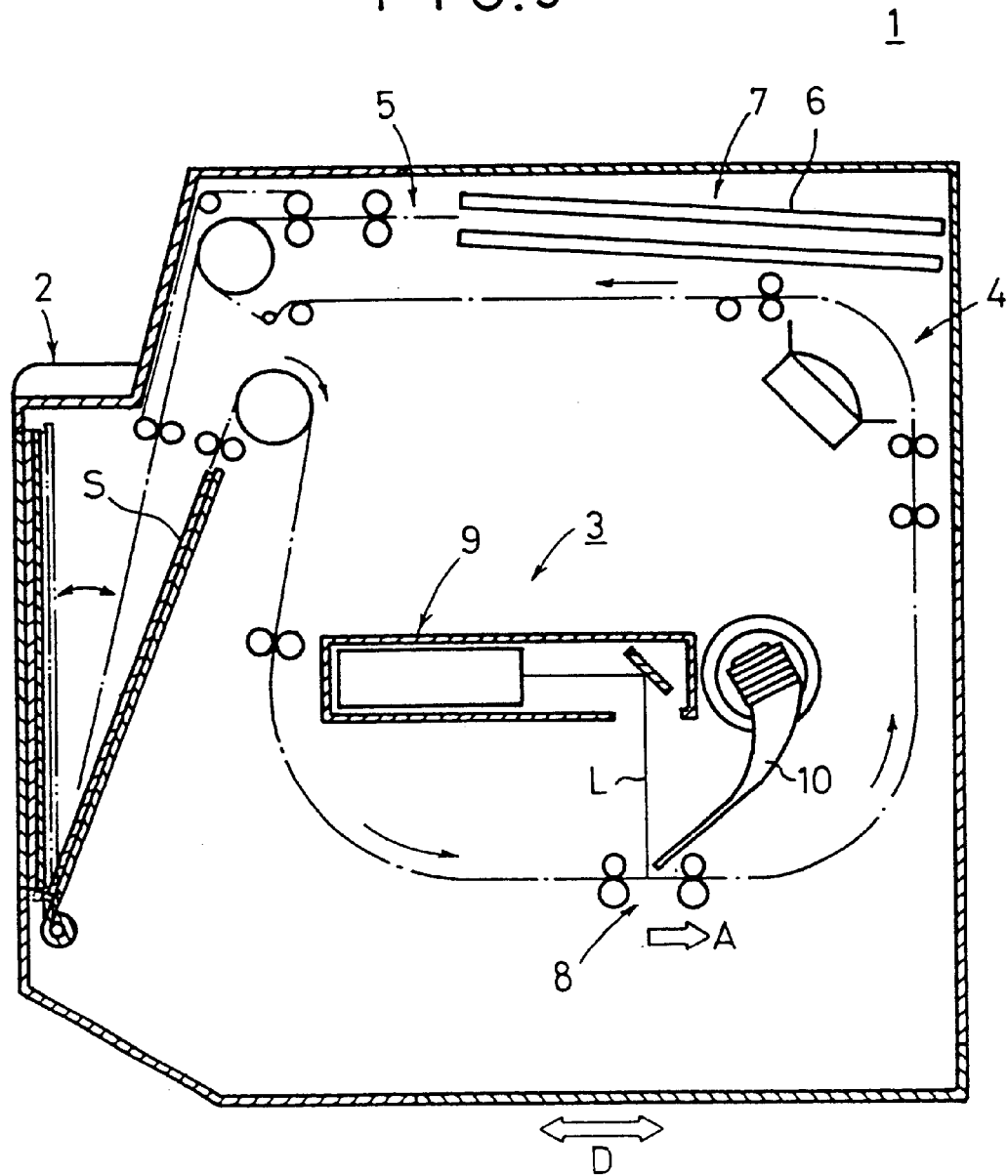
FIG. 5 is a vertical cross-sectional view of an internal structure of a conventional radiation image information reading apparatus.

FIG. 4 shows in vertical cross section an internal structure of a main assembly 140 of a radiation image information reading apparatus according to a third embodiment of the present invention. The main assembly 140 houses an exposure unit 142, an image information reading unit 144, and an erasing unit 146. The image information reading unit 144 and the erasing unit 146 are vertically oriented and positioned closely to each other. Only one stimulable phosphor sheet S is housed in the main assembly 140 and can be fed reciprocally along one feed path by a feed system 148.

In the third embodiment, after the radiation image information of a subject (not shown) is recorded on the stimulable phosphor sheet S in the exposure unit 142, the stimulable phosphor sheet S is turned through 180° by the feed system 148, and delivered to the image information reading unit 144.

In the image information reading unit 144, as in the image information reading unit 32, the stimulable phosphor sheet S is fed downwardly in the auxiliary scanning direction, and a laser beam L emitted from the laser beam applying means 48 is applied substantially horizontally to the exposure surface of the stimulable phosphor sheet S. In response to the application of the laser beam L, the stimulable phosphor sheet S emits light which is collected by the light guide 52 and then photoelectrically converted by a photomultiplier (not shown).

As the recorded radiation image information is read from the stimulable phosphor sheet S by the image information reading unit 144, the read portion of the stimulable phosphor sheet S is continuously introduced into the erasing unit 146. Consequently, any remaining radiation image information in the read portion of the stimulable phosphor sheet S is immediately erased.

In the third embodiment, as described above, the image information reading unit 144 and the erasing unit 146 are vertically oriented and positioned closely to each other. While the recorded radiation image information is read from the stimulable phosphor sheet S, any remaining radiation image information is substantially simultaneously erased from the read portion of the stimulable phosphor sheet S. Consequently, the main assembly 140 can be reduced in size. A reduction in the size of the main assembly 140 can also be achieved because only one stimulable phosphor sheet S is housed in the main assembly 140.

In the image information reading unit 144, another light guide 52 (see the two-dot-and-dash lines in FIG. 4) may be disposed so as to face the reverse surface of the stimulable phosphor sheet S. With the additional light guide 52, the image information reading unit 144 can detect light emitted from both the exposure surface and the reverse surface of the stimulable phosphor sheet S.

In the radiation image information reading apparatus according to the present invention, while the stimulable phosphor sheet is being fed vertically in the auxiliary scanning direction, stimulating rays are applied substantially horizontally to the stimulable phosphor sheet. Accordingly, the horizontal dimensions of the main assembly housing the image information reading unit are much smaller than a conventional image information reading unit in which the stimulable phosphor sheet is fed horizontally in the auxiliary scanning direction. As a consequence, the radiation image information reading apparatus can be reduced in size, and such a size reduction can be accomplished economically by vertically orienting the image information reading unit.

Although certain preferred embodiments of the present invention have been shown and described in detail, it should be understood that various changes and modifications may be made therein without departing from the scope of the appended claims.

What is claimed is:

1. An apparatus for repeatedly recording and reading the radiation image information of a subject on and from a stimulable phosphor sheet housed in the apparatus, comprising:

an exposure unit for recording radiation image information of a subject on the stimulable phosphor sheet;

an image information reading unit for applying stimulating rays to said stimulable phosphor sheet to photoelectrically read the radiation image information recorded on said stimulable phosphor sheet; and an erasing unit for erasing remaining radiation image information from said stimulable phosphor sheet after the recorded radiation image information is read from said stimulable phosphor sheet;

said image information reading unit comprising:

auxiliary scanning feed means for feeding said stimulable phosphor sheet vertically in an auxiliary scanning direction;

stimulating rays applying means for applying said stimulating rays substantially horizontally to said stimulable phosphor sheet which is being fed in the auxiliary scanning direction, and scanning said stimulable phosphor sheet with said stimulating rays in a main scanning direction; and light guide means for collecting light emitted from said stimulable phosphor sheet when said stimulating rays are applied to said stimulable phosphor sheet.

2. An apparatus according to claim 1, wherein said exposure unit and said image information reading unit are disposed substantially parallel to each other, further comprising turning feed means disposed between said exposure unit and said image information reading unit, for turning said stimulable phosphor sheet through 180° and delivering said stimulable phosphor sheet.

3. An apparatus according to claim 2, wherein said turning feed means comprises:

a pair of curved guide plates disposed in contact with opposite marginal edges of said stimulable phosphor sheet outside of a recorded area thereof; and a plurality of guide rollers disposed beneath said curved guide plates.

4. An apparatus according to claim 3, comprising two stimulable phosphor sheets housed in the apparatus, wherein when-one of the stimulable phosphor sheets is placed in said exposure unit, the other stimulable phosphor sheet is positioned in a standby mode in said erasing unit.

5. An apparatus according to claim 2, wherein said erasing unit is disposed substantially parallel to said exposure unit and said image information reading unit, and comprises means for applying erasing light to said stimulable phosphor sheet while feeding said stimulable phosphor sheet vertically.

6. An apparatus according to claim 2, wherein said light guide means comprises first and second light guides disposed one on each side of said stimulable phosphor sheet, for collecting light emitted from both surfaces of said stimulable phosphor sheet when said stimulating rays are applied thereto.

7. An apparatus according to claim 2, comprising two stimulable phosphor sheets housed in the apparatus, wherein when one of the stimulable phosphor sheets is placed in said exposure unit, the other stimulable phosphor sheet is positioned in a standby mode in said erasing unit.

8. An apparatus according to claim 1, wherein said image information reading unit and said erasing unit are vertically oriented and positioned closely to each other such that while the radiation image information is being read from said stimulable phosphor sheet by said image information reading unit, remaining radiation image information is erased from said stimulable phosphor sheet by said erasing unit.

9. An apparatus according to claim 8, comprising a single stimulable phosphor sheets housed in the apparatus.

10. An apparatus according to claim 9, further comprising a feed system for feeding said single stimulable phosphor sheets reciprocally along one feed path.

* * * * *